United States Patent [19]

Fujiwara et al.

[11] Patent Number: 5,194,536
[45] Date of Patent: Mar. 16, 1993

[54] PROCESS OF PREPARING LOWER VINYL CHLORIDE POLYMER BY SUSPENSION POLYMERIZATION

[75] Inventors: Makoto Fujiwara; Toshimichi Koga; Toshikatsu Yamamuro, all of Ibaraki, Japan

[73] Assignee: Shin-Etsu Chemical Co., Ltd., Tokyo, Japan

[21] Appl. No.: 739,431

[22] Filed: Aug. 2, 1991

[30] Foreign Application Priority Data

Aug. 3, 1990 [JP] Japan ................... 2-206047

[51] Int. Cl.$^5$ ..................... C08F 14/06; C08F 2/20
[52] U.S. Cl. ..................... 526/204; 526/273
[58] Field of Search ..................... 526/204, 209

[56] References Cited

U.S. PATENT DOCUMENTS 2,993,034  7/1961  Swern ..................... 526/273
4,845,174  7/1989  Amano ..................... 526/62
4,999,071  3/1991  Nakamura ..................... 526/345

Primary Examiner—Christopher Henderson
Attorney, Agent, or Firm—Oblon, Spivak, McClelland, Maier & Neustadt

[57] ABSTRACT

A process of preparing a lower vinyl chloride polymer which comprises suspension polymerization of a vinyl chloride monomer of a mixture of unsaturated monomers consisting essentially of vinyl chloride, in an aqueous solvent, in the presence of a straight chain alkyl vinyl compound having an epoxy end terminal group represented by the formula I:

$$CH_2=CH-(CH_2)_n-CH\underset{O}{\overset{}{\diagup\!\!\!\diagdown}}CH_2 \quad (I)$$

wherein n is an integer of 2-20.

3 Claims, No Drawings

PROCESS OF PREPARING LOWER VINYL CHLORIDE POLYMER BY SUSPENSION POLYMERIZATION

BACKGROUND OF THE INVENTION

The present invention relates to a process of preparing lower vinyl chloride polymer, and in particular to a process of preparing lower vinyl chloride polymers which are useful in producing hard polyvinyl chloride articles useful for applications requiring high moldability and good heat resistance, e.g., bottles, containers, films, and building materials, such as rainwater pipes, window frames, gutters, corrugated sheets or the like.

Vinyl chloride polymer is used in a wide range of applications, since, by adding different kinds of plasticizers to the polymerization mixture and controlling the polymerization conditions, it is possible to obtain vinyl chloride polymers having a wide range of hardness and mechanical properties, chemical resistances, weather resistances, and transparencies.

To produce such hard polyvinyl chloride articles, only lower vinyl chloride polymers having a polymerization degree of no more than 800 can be used to secure the required physical properties.

One industrial method for producing such lower vinyl chloride polymers has been to simply increase the polymerization temperature. If, for example, a polymerization degree of about 600 is desired the polymerization temperature should be 70° C. or higher, assuming all other polymerization conditions are conventional. However, it has been found that at such high temperatures, the primary-stage reaction will be undesirably accelerated, with the result that the polymer produced will be heterogeneous. Furthermore, at such high temperatures, the vapor pressure of the vinyl chloride monomer will rise to as high as 13 kg/cm$^2$, so that it is necessary to increase the pressure capacity of the polymerization reactor.

In order to produce lower polymers industrially at lower temperatures, methods have been attempted wherein the polymerization is carried out in the presence of so-called "chain transfer agents" such as an organic mercaptan or a halogenated hydrocarbon. However, at a low polymerization degree, especially 700 or lower, using a chain transfer agent often results in an unstable suspension polymerization mixture, and the resulting polymer particles are so coarse that the particle size distribution is abnormally distorted. In extreme cases, the polymer particles coagulate to form blocks. Attempts at increasing the amount of the suspension agent to compensate for this problem resulted in a too wide particle size distribution so that the gelation characteristic becomes nonuniform and the workability becomes poor. A further disadvantage of use of a chain transfer agent is that residual agent causes degradation of the thermal stability of the polymer.

SUMMARY OF THE INVENTION

Therefore, it is one object of the present invention to provide a process of preparing a vinyl chloride polymer which uses a relatively low temperature but produces, at a high yield and rate a lower vinyl chloride polymer which is characterized by a good particle size distribution, excellent moldability and excellent thermal stability.

These and other objects, as will become more apparent during the following detailed description of the present invention, have been achieved by the use of a straight chain alkyl vinyl compound in the suspension polymerization reaction of the vinyl chloride.

According to the present invention, a lower vinyl chloride polymer, preferably one having a polymerization degree of 700 or lower, is prepared by suspension polymerization of a vinyl chloride monomer or a mixture of unsaturated monomers consisting essentially of vinyl chloride, in an aqueous solvent, in the presence of a straight chain alkyl vinyl compound having an end terminal epoxy group represented by the formula:

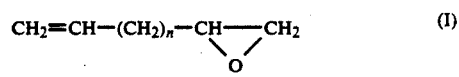
(I)

wherein n is an integer of 2-20; the straight chain alkyl vinyl compound being present in an amount of 2.5-10 weight parts per 100 weight parts of the vinyl chloride monomer or a mixture of unsaturated monomers.

The integer n in the formula I representing the straight chain alkyl vinyl compound used in the present invention is 2-20, and preferably 2-14. When n is larger than 20, the chain transfer effect attained per unit additive amount of the compound will be decreased, and the thermal stability of the resulting polymer also will be decreased. Examples of appropriate compounds (I) include 1,2-epoxyhexene-5, 1,2-epoxyheptene-6, 1,2-epoxyoctene-7, and mixtures thereof.

This compound is present in an amount of 2.5 to 10 weight parts, preferably 2.5 to 7 weight parts, per 100 weight parts of the vinyl chloride monomer or a mixture of unsaturated monomers which consist essentially of vinyl chloride. When the quantity is less than 2.5 weight parts, the chain transfer effect will be insufficient; on the other hand, when the quantity exceeds 10 weight parts, the polymerization will be retarded, and the amount of time required for polymerization will be too long to be practical.

Compound (I) is added to the polymerization mixture either before or immediately after the commencement of the polymerization, or alternatively, during the polymerization. It is also possible to add some quantity prior to and some during the polymerization, but the former is more practical because of simplicity.

The polymerization mixture may consist solely of vinyl chloride monomer or may consist of a mixture of unsaturated monomers consisting essentially (50 weight % or more) of, and capable of forming copolymers with, vinyl chloride. Examples of suitable unsaturated monomer which can copolymerize with vinyl chloride include vinyl esters such as vinyl acetate, vinyl propionate; acrylic esters and methacrylic esters such as methyl acrylate and ethyl acrylate; olefins such as ethylene and propylene; vinyl ethers such as lauryl vinyl ether and isobutyl vinyl ether; maleic anhydride; acrylonitrile; stylene; and vinylidene chloride.

The suspension polymerization reaction is conducted in an aqueous solvent. Dispersing agent(s) as are conventionally used in polymerization of vinyl chloride in an aqueous solvent can be used in the present reaction. Examples of suitable dispersants include aqueous cellulose ethers such as methyl cellulose, ethyl cellulose, hydroxyethyl cellulose, hydroxypropyl cellulose, and hydroxypropylmethyl cellulose; partially saponified polyvinyl alcohols; acrylic polymers; aqueous polymers such as gelatin; oil soluble emulsifiers such as sorbitan monolaurate, sorbitan triolate, sorbitan monostearate, glyceline tristearate, and ethylene oxide propylene oxide block copolymer; aqueous emulsifiers such as polyoxyethylene sorbitan monolaurate, polyoxyethylene glyceline olate, and sodium laurylsulfate; calcium carbonate; calcium phosphate; and sodium dodecylbenzenesulfonate. These can be used alone or in mixtures thereof.

A polymerization conventional initiator can be used such as percarbonate compounds, such as diisopropylperoxydicarbonate, di-2-ethylhexylperoxydicarbonate, or diethoxyethylperoxydicarbonate; perester compounds, such as t-butylperoxypivalate, t-hexylperoxypivalate, t-butylperoxyneodecanate, or α-cumylperoxyneodecanate; peroxides, such as acetylcyclohexylsulfonylperoxide, 2,4,4-trimethylpentyl-2-peroxyphenoxyacetate, 3,5,5-trimethylhexanoilperoxide, or lauroylperoxide; azo compounds, such as azobis-2,4-dimethylvaleronitrile, azobis(4-methoxy-2,4-dimethylvaleronitrile); or oil soluble catalysts, any of which may be used alone or in admixtures thereof.

Oil soluble catalysts may be used in combination with water-soluble catalysts, such as potassium persulfate, ammonium persulfate, hydrogen peroxide, or cumenhydro peroxide.

Other polymerization conditions such as the proportion of additives, polymerization temperature, and the manner of charging water-soluble medium, vinyl chloride monomer or other comonomers as the case may require, auxiliary dispersing agents, polymerization initiators, etc. may be similar to those conventionally used.

Optionally, one may include in the polymerization mixture a polymerization modifier, a pH modifier, a gelatinization modifier, an antistatic agent, a cross linking agent, a stabilizer, a filler, an oxidation inhibitor, a buffer, a scale-preventive agent, or the like.

Having now generally described the invention, a more detailed understanding can be obtained by reference to certain specific examples, which are intended as illustration only and not intended to be limiting of the invention.

EXAMPLE 1

A polymerization reactor having a content volume of 2 m$^2$ equipped with a stirrer was charged with 1,000 g of deionized water and 350 g of polyvinyl alcohol. After degassing the reactor, it was further charged with 700 kg of vinyl chloride monomer, 28 kg of 1,2-epoxyhexene-5, and 700 g of di-2-ethylhexylperoxydicarbonate. Then, the reactor was heated until the temperature in the reactor became 60° C. whereupon the polymerization was started.

The reaction was terminated when the intra-reactor pressure fell to 6.5 kg/cm$^2$G; then, the unreacted monomers were recovered in the form of gas. The polymer slurry was discharged from the reactor, dehydrated and dried and a polyvinylchloride was obtained.

COMPARATIVE EXAMPLE 1

A polymerization reaction was conducted in exactly the same manner as in Example 1 except that the polymerization mixture lacked 1,2-epoxyhexene-5, and a polyvinylchloride was obtained.

EXAMPLE 2

A polymerization reaction was conducted in exactly the same manner as in Example 1 except that the amount of 1,2-epoxyhexene-5 was 21 kg, and a polyvinylchloride was obtained.

EXAMPLE 3

A polymerized reaction was conducted in exactly the same manner as in Example 1 except that the amount of 1,2-epoxyhexene-5 was 42 kg, and a polyvinylchloride was obtained.

COMPARATIVE EXAMPLE 2

A polymerization reaction was conducted in exactly the same manner as in Example 1 except that the amount of 1,2-epoxyhexene-5 was 7 kg, and a polyvinylchloride was obtained.

COMPARATIVE EXAMPLE 3

A polymerization reaction was conducted in exactly the same manner as in Example 1 except that 630 g of 2-mercaptoethanol was added in place of 1,2-epoxyhexene-5, and a polyvinylchloride was obtained.

COMPARATIVE EXAMPLE 4

A polymerization reaction was conducted in exactly the same manner as in Example 1 except that 15.4 kg of trichloroethylene was added in place of 1,2-epoxyhexene-5, and a polyvinylchloride was obtained.

Physical properties of the polyvinylchlorides obtained in the above experiments were measured by the methods described below and the result is shown in the table.

Average degree of polymerization: measured in accordance with JIS K-6721.

Particle size distribution: measured with the screens of JIS Z-8801.

Thermal stability

A mixture consisting of 100 weight parts of polyvinylchloride, 50 weight parts of DOP, one weight part of tin mercaptite, and 0.5 part of a cadmium compound is kneaded using kneading rolls for five minutes at 160° C.; a 0.8 mm-thick sheet was obtained, which was placed in a gear oven and heated at 190° C.; the time was measured until the sheet entirely turned black. The longer the time, the higher the thermal stability.

Having now fully described the invention, it will be apparent to one of ordinary skill in the art that many changes and modifications can be made without varying from the intent and scope of the invention.

TABLE

|  |  | Examples | | | Comparative Examples | | | |
|---|---|---|---|---|---|---|---|---|
|  |  | 1 | 2 | 3 | 1 | 2 | 3 | 4 |
| Conditions |  |  |  |  |  |  |  |  |
| 1,2-epoxyhexene-5 | amount added (kg) | 28 | 21 | 42 | — | 7 | — | — |
|  | per VC (wt %) | 4 | 3 | 6 | — | 1 | — | — |
| 2-mercaptoethanol | amount added (g) | — | — | — | — | — | 630 | — |
|  | per VC (wt %) | — | — | — | — | — | 0.09 | — |
| trichloroethylene | amount added (kg) | — | — | — | — | — | — | 15.4 |
|  | per VC (wt %) | — | — | — | — | — | — | 2.2 |

TABLE-continued

| | | Examples | | | Comparative Examples | | | |
|---|---|---|---|---|---|---|---|---|
| | | 1 | 2 | 3 | 1 | 2 | 3 | 4 |
| Results | | | | | | | | |
| Average degree of polymerization | | 520 | 600 | 450 | 900 | 820 | 520 | 530 |
| Particle size | 60# pass (wt %) | 100.0 | 100.0 | 100.0 | 100.0 | 100.0 | 54.9 | 69.0 |
| distribution | 80# pass (wt %) | 99.6 | 99.9 | 99.5 | 99.7 | 99.9 | 8.4 | 12.8 |
| | 100# pass (wt %) | 90.8 | 95.1 | 90.1 | 93.7 | 96.2 | 4.2 | 8.0 |
| | 120# pass (wt %) | 53.6 | 60.4 | 51.1 | 54.8 | 62.8 | 2.5 | 5.2 |
| | 150# pass (wt %) | 20.2 | 25.2 | 19.8 | 22.0 | 29.0 | 1.5 | 2.8 |
| | 200# pass (wt %) | 3.5 | 4.2 | 2.5 | 3.9 | 5.5 | 0.5 | 0.8 |
| Thermal stability (minutes) | | 120 | 110 | 140 | 60 | 80 | 50 | 50 |

Accordingly what is claimed as new and desired to be secured by Letters Patent of the United States is:

1. A process of preparing a lower vinyl chloride polymer having an average polymerization degree of 700 or lower which comprises suspension polymerization of a vinyl chloride monomer or a mixture of unsaturated monomers consisting essentially of vinyl chloride, in an aqueous solvent, in the presence of a straight chain alkyl vinyl compound having an epoxy end terminal group represented by the formula,

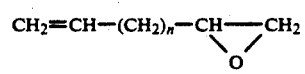

wherein n is an integer of 2-20; and said straight chain alkyl vinyl compound being present in an amount of 2.5-7 weight parts per 100 weight parts of the vinyl chloride monomer or a mixture of unsaturated monomers.

2. The process of claim 1 wherein the integer n in the formula I is 2-14.

3. The process of claim 1 wherein said unsaturated monomer is selected from the group consisting of vinyl ester, acrylic ester, methacrylic ester, olefin, vinyl ether, maleic anhydride, acrylonitrile, styrene, and vinylidene chloride.